United States Patent

Hammer et al.

Patent Number: 5,506,474
Date of Patent: Apr. 9, 1996

[54] COMPACT FLUORESCENT LAMP USING A LIGHT REFLECTING ADHESIVE MATERIAL

[75] Inventors: Edward E. Hammer, Mayfield Village; Vito J. Arsena, Highland Heights, both of Ohio; Ferenc Lantos; Elizabeth Cserteg, both of Budapest, Hungary

[73] Assignee: General Electric Company, Schenectady, N.Y.

[21] Appl. No.: 414,460

[22] Filed: Mar. 31, 1995

[51] Int. Cl.⁶ .......................................................... H01J 7/44
[52] U.S. Cl. .............................. 315/56; 315/58; 313/490; 313/130
[58] Field of Search ................................. 315/56, 58, 71; 313/486, 489, 490, 114, 318

[56] References Cited

U.S. PATENT DOCUMENTS 3,953,761  4/1976  Giudice ............................ 315/71
4,694,215  9/1987  Hofmann .......................... 313/44
5,361,017  11/1994  Krause ............................. 315/151

*Primary Examiner*—Frank Gonzalez
*Assistant Examiner*—Reginald A. Ratliff
*Attorney, Agent, or Firm*—George E. Hawranko; Stanley C. Corwin

[57] ABSTRACT

A compact fluorescent lamp having a lamp envelope with a plurality of lamp ends disposed within a housing or base configuration, utilizes an enhanced adhesive material for securing the lamp envelope to the housing or base that is reflective. The adhesive material has a reflective material added thereto that allows for the light typically absorbed or otherwise lost in the housing, to be reflected back out thereby improving the luminous efficiency of such lamp. The adhesive material is also effective for blocking UV radiation from entering the area in which electronic components of the ballast circuit may be disposed.

10 Claims, 2 Drawing Sheets

5,506,474

COMPACT FLUORESCENT LAMP USING A LIGHT REFLECTING ADHESIVE MATERIAL

FIELD OF THE INVENTION

This invention relates to a compact fluorescent lamp which utilizes a novel adhesive material for securing a lamp envelope into a housing or other base configuration. More particularly, this invention relates to such an adhesive material for a compact fluorescent lamp that not only acts as an adhesive material with UV inhibiting properties but also serves to act as a reflector thereby improving the lumen efficiency of such lamp.

BACKGROUND OF THE INVENTION

In recent years there has been a tremendous increase in the use of compact fluorescent lamps in place of conventional incandescent lamps. Because of the longer life and the improved energy efficiency of the compact fluorescent lamp over that of the conventional incandescent lamp, consumers as well as commercial establishments have been willing to convert to the compact fluorescent lamps. An example of such a compact fluorescent lamp can be found in U.S. Pat. No. 4,503,360 issued to D. E. Bedel on Mar. 5, 1985. It will be noted that for the typical compact fluorescent lamp, the lamp envelope is shaped in a manner whereby a plurality of parallel extending tube portions extend from a base portion for a predetermined length.

In order to compare favorably to the incandescent lamps, one area that must be addressed by lamp designers is the ability to achieve higher lumen output levels than are presently achieved; for instance, it would be desirable to provide a compact fluorescent lamp that would achieve substantially the same lumen output as a 75 to 100 watt incandescent lamp. A compact fluorescent lamp of sufficiently high power to give the lumen output of a 100 Watt or higher incandescent lamp while running at currents low enough to be very efficient requires a relatively long arc length of greater than approximately 60 cm. To provide a glass tube with such a length that would fit within the small overall size of the conventional incandescent lamp of the same lumen output, lamp manufacturers have gone to extending the lengths of the respective tube portions of the lamp envelope or, in the alternative, to increasing the number of such tube portions to as many as eight such tube portions. As an example of such an application, some compact fluorescent lamps are produced by bending segments of 12 mm tubing into U-shapes and sealing off one or both legs and then connecting two or more of such bent tubes with glass bridges made by simultaneously blowing out a small hole near the bottom of two tubes and fusing them together. The discharge length then passes up one leg, down the other and then through the glass bridge to the second bent tube arrangement and so forth. Another approach to attaining the longer discharge paths needed for higher wattage lamp configurations is to use a coiled tubular lamp envelope. An example of such an arrangement can be found in German Patent Application No. DE 4133077 filed in Germany on Oct. 2, 1991 and assigned to Narva Berliner Gluhlampenwerk GmbH. In this application, a simple coil arrangement is provided whereby the glass tubing is double wound with an interconnecting bridge portion formed at the top area connecting the two wound coil portions.

Regardless of the configuration of the lamp envelope, whether U-shaped or coiled, there is a need to secure the lamp envelope either to a plug base which can be inserted into an adaptor, or, to a housing arrangement that would also include an integral ballast circuit contained therein. In either instance, it has been found that the adhesive material that is used is dark in color, typically brown, and hence tends to absorb the light output that is generated at the ends of the lamp envelope disposed within the housing or plug member. For a U-shaped lamp envelope where it is possible to have as many as eight such tube ends, there is a significant amount of light lost due to absorption by the adhesive material. One approach to solving this problem of light absorption caused by the adhesive material is to first apply a reflective coating on the ends of the lamp envelope. When such an approach was attempted, it was found that the reflective material could not stay on the ends of the lamp envelope and as such, the adhesive material used to secure the lamp envelope into the base was pulling the reflective coating off of the lamp and therefore resulting in poor adhesion of the envelope to the base.

Of additional concern in mounting the lamp envelope to the housing or plug member, is the fact that UV radiation may escape from the bottom of the lamp envelope ends and be directed down towards the electronic components that make up electronic ballast circuits. It is known that UV over time can deteriorate such electronic components. Accordingly, it would be advantageous if an adhesive material could be developed that would not only reduce the amount of light that is lost through absorption at the lamp envelope ends, but could also be effective in reducing or eliminating the amount of UV radiation that escapes and affects electronic components associated with the ballast circuit.

SUMMARY OF THE INVENTION

The present invention provides a low pressure discharge lamp that utilizes an adhesive material effective for securing the lamp envelope to the base assembly and whereby, in achieving such secure arrangement, a further advantage is achieved in that the adhesive material reflects light outward thus avoiding the absorption of such light in the adhesive material. The present invention also provides that the adhesive material serves to prevent UV radiation from entering the inside of the base assembly where electronic components can reside.

In accordance with the principles of the present invention, there is provided a low pressure discharge lamp which includes a tubular lamp envelope having a plurality of end segments associated therewith. The lamp envelope has an interior wall on which is disposed a phosphor coating and further, contains a gas fill which is energizable to a discharge state. A base member is provided on which the lamp envelope is securely mounted. An adhesive material is provided for securely mounting the lamp envelope to the base member; the adhesive material having added thereto, a reflecting material which is effective so as to render such adhesive material reflecting. In another embodiment of the present invention, the reflecting material can also provide UV radiation blocking capabilities such that electronic components that may be mounted within the base member are protected thereby.

BRIEF DESCRIPTION OF THE DRAWINGS

In the following detailed description, reference will be made to the drawings in which.

DETAILED DESCRIPTION OF THE INVENTION

Figure 1:
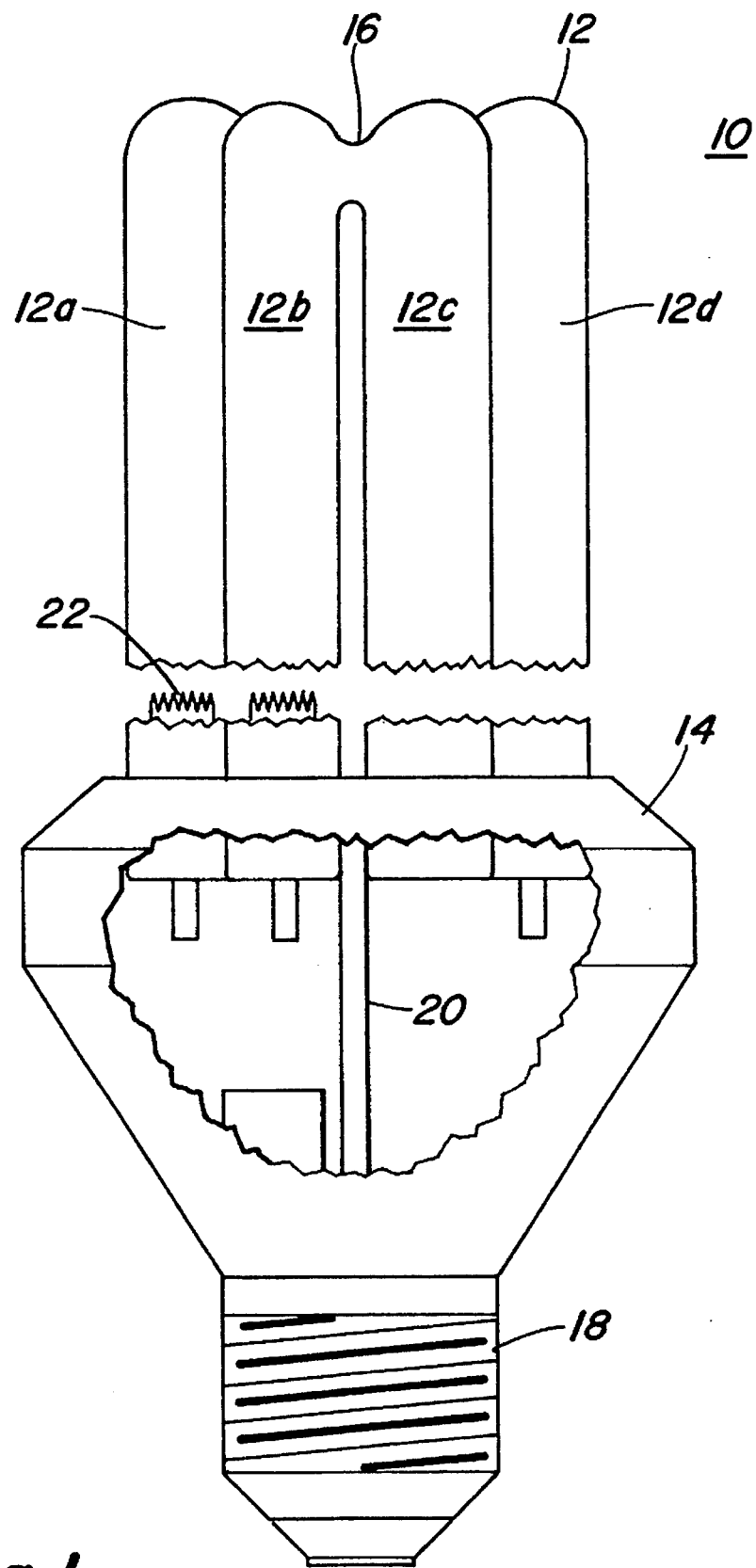
FIG. 1 is an elevational view in section of a discharge lamp with a reflecting adhesive material constructed in accordance with the present invention.

As seen in FIG. 1, a compact fluorescent lamp 10 includes a lamp envelope configuration 12 with a plurality of extension tubes 12a, 12b, 12c and 12d, each of which extend upward from a housing 14 in a parallel manner to one another. Though illustrated as including four extension tubes, the lamp envelope configuration 12 of FIG. 1 can include either six or eight such extension tubes each of which would be disposed along the outer periphery of the top portion of the housing 14. In conventional practice, the extension tubes 12a, 12b, 12c and 12d are joined together in pairs and are essentially U-shaped with a junction 16 formed at the top of each pair. Additionally, a bridge connection (not shown) is formed at the bottom portion of each pair of extension tubes so as to connect the plurality of extension tubes in a continuous discharge path. A threaded screw base 18 is mounted on the bottom portion of the housing 14 to allow for use of the compact fluorescent lamp 10 in conventional light sockets (not shown). Also illustrated in FIG. 1 is a ballast circuit arrangement 20 which is mounted within the housing 14 and which is effective for receiving line power through the screw base 18 and converting the line power into an operating signal which is connected to electrodes 22 for driving the discharge. The discharge occurs within the lamp envelope 12 in a standard manner whereby a fill of mercury and a noble gas is excited to a discharge state by introduction of the operating signal generated by the ballast circuit arrangement 20. The ballast circuit arrangement 20 can include electronic components 24 which can be adversely affected in terms of life and performance measurements, when such components are exposed to UV radiation. For a detailed discussion of the operation of the ballast circuit arrangement 20, reference is hereby made to U.S. Pat. No. 5,341,068 issued to Nerone on Aug. 23, 1994, assigned to the same assignee as the present invention and herein incorporated by reference. A phosphor coating disposed on the inner surface of the lamp envelope is effective for converting the discharge into visible light as is well known in the art.

It should be noted that in order to achieve the higher lumen output configurations similar to those of conventional incandescent lamps that the compact fluorescent lamp is intended to replace, it is necessary to increase the discharge path within the lamp envelope to a length of greater than approximately 60 cm. By use of the parallel extension tubes 12a, 12b, 12c, and 12d (and as many as eight) of the prior art, there is a decrease in efficiency in that a greater number of extension tube end portions are disposed within the top portion of the housing 14 and therefore the light generated thereby is lost. Additionally, since there is a limit to the length of each extension tube as dictated by the size of the lighting fixtures in which the compact fluorescent lamp is intended for use, it is necessary to provide a larger number of extension tubes around the outer periphery of the top portion of the housing member 14. By such an arrangement, it has been found that a drop in luminous efficiency occurs as a result of the large number of end portions that are disposed within the top cap portion of the housing 14. With conventional adhesive materials used to secure the lamp envelope to the housing or base configuration, this lumen efficiency decrease occurs because such conventional adhesives are dark and absorb light produced at these end regions. According to the present invention, such problem is substantially avoided by use of the adhesive material 26 placed at the end segments of lamp envelope 12 disposed within housing 14.

The adhesive material 26 is a calcium carbonate filled clear silicone resin with an additive of titanium dioxide ($TiO_2$) which serves as a reflective agent. A representative composition of materials that combine to form adhesive material 26 includes a quantity of silicone resin at a ratio of between 10 and 15 percent total weight of the adhesive mixed. The silicone resin used herein is commercially available from Dow Corning Corporation as their product number DC-6-2230. Also included in the composition is an amount of marble flour (product ID number 33-MX3B) at a ratio of between 50 to 80 percent total weight. Denatured Alcohol at a ratio of between 5 and 10 percent total weight can be added as well to the adhesive material 26. Also included is Triethanolamine at a ratio of less than 1 percent total weight. Aerosil R972 available from DeGussa Corporation is added at a ratio of approximately 1 to 1.5 percent total weight and is effective for insuring that the adhesive material 26 does not sag once applied. As to the reflective material, one embodiment of the present invention uses titanium dioxide at a ratio of between 3 and 5 percent total weight and is available from Kemira, Inc. of Savannah, Ga., as their product ID Unitane 0-220. Other reflective materials can be used as well such as white silica. In the preferred embodiment of the invention, the reflective material used us a UV stabilized titania having an additive of approximately 0.5 percent Antimony Trioxide. Such a material not only renders the adhesive material 26 as reflective, but has the added benefit of blocking UV radiation at wavelengths of below 300 nanometers from turning the adhesive material yellow and from affecting the electronic components 24 of the ballast circuit arrangement 20. Using this adhesive material 26, lamps were constructed and tested with the results being a measured increase in luminous efficiency of between 3 and 5 percent. With such an adhesive material 26, there is a further advantage in that such material 26 is now whitened and therefore more aesthetically pleasing. If such adhesive material 26 should be visible on the exterior of the lamp housing 14, the whitened material 26 of the present invention will more readily blend with the color of such housing 14.

Figure 2:
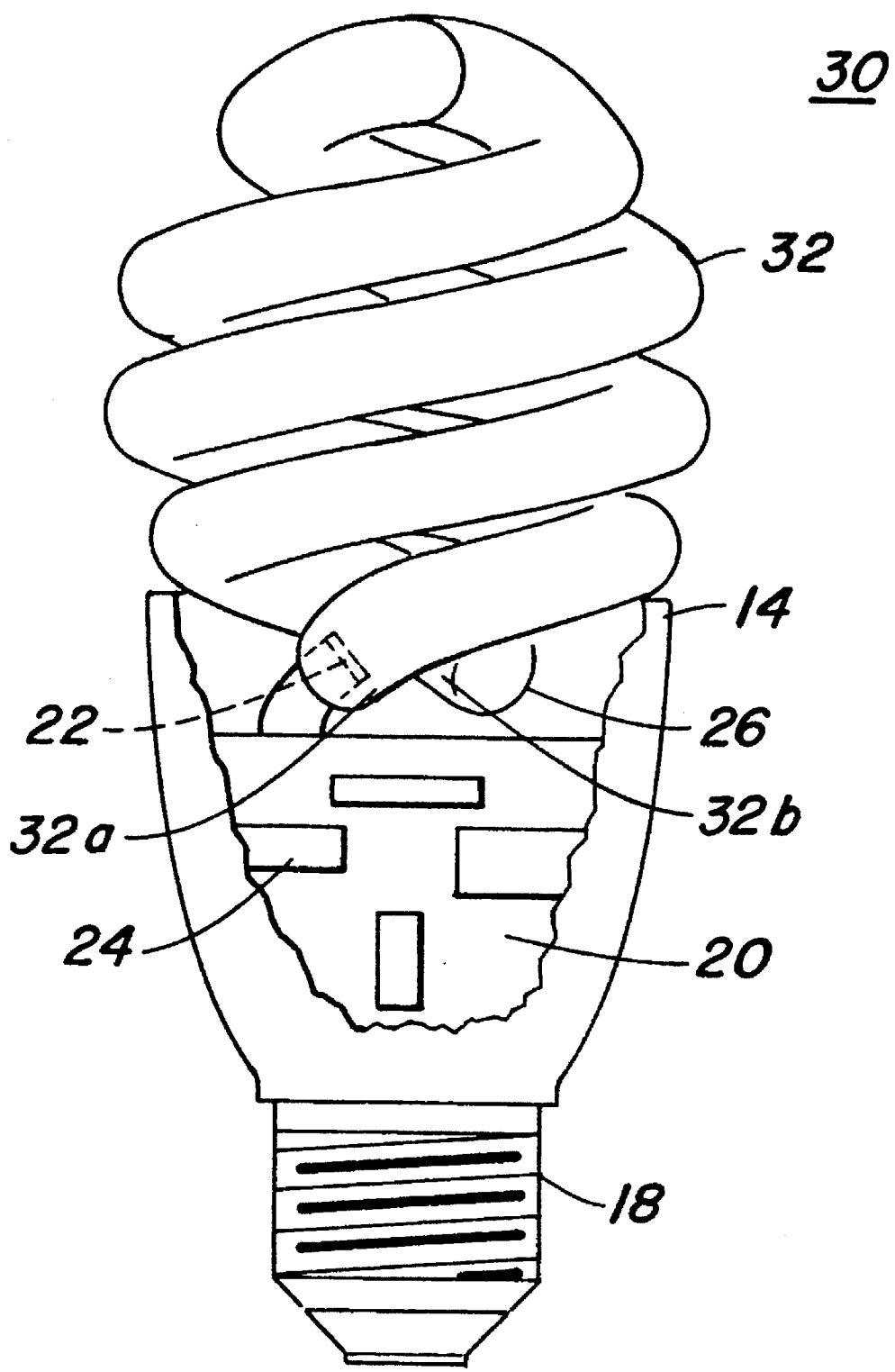
FIG. 2 is an elevational view in section of an alternate embodiment of a discharge lamp with the adhesive material of the present invention.

In addition to benefitting a compact fluorescent lamp 10 having many end segments disposed within the top cap portion of the housing 14,the adhesive material of the present invention could also be advantageously utilized in a compact fluorescent lamp 30 such as shown in FIG. 2. In this lamp 30, the lamp envelope 32 develops the long discharge path needed for higher wattage lamps by coiling the lamp envelope 32 thereby resulting in only two end segments 32a residing in the top cap portion of the housing 14. The use of adhesive material 26 would still provide the benefit of eliminating the absorption of light at such two end segments 32a and would also provide the UV radiation blocking advantage previously discussed.

In terms of the process for preparing the adhesive material 26, the following steps were taken:

a) Silicone resin, Denatured Alcohol and Triethanoline were combined and shaken or stirred until the silicone resin dissolved;

b) Marble flour, Aerosil 972 and $TiO_2$ were combined and shaken or stirred until blended; and, c) the flour mixture (step b) was placed in a container with the resin mixture (step a) and shaken or stirred until blended.

The mixture of adhesive material 26 was then used within 48 hours of preparation. During such use, the adhesive material 26 was applied to the lamp envelope ends and/or the top cap region of the housing 14 and then placed in an oven set at 180 degrees Celsius for 10 minutes to allow for curing.

Although the hereinabove embodiment constitutes the preferred embodiment of the invention, modifications can be made thereto without departing from the scope of the invention as set forth in the appended claims. For example, this adhesive material 26 could also be used in certain incandescent lighting applications such as a reflector lamp. Additionally, though shown with compact fluorescent lamps having integral ballast circuits, this invention could be used with a plug/adaptor type of compact fluorescent product.

We claim:

1. A low pressure discharge lamp comprising:
   a tubular lamp envelope having a plurality end segments associated therewith, said lamp envelope having an interior wall on which is disposed a phosphor coating and further, containing a gas fill which is energizable to a discharge state;
   a base member on which said lamp envelope is securely mounted;
   an adhesive material for securely mounting said lamp envelope to said base member; and
   a reflecting material added to said adhesive material so as to render such adhesive material reflecting.

2. A discharge lamp as set forth in claim 1 wherein said adhesive material is a calcium carbonate filled silicone resin.

3. A discharge lamp as set forth in claim 1 wherein said reflective material is titanium dioxide.

4. A discharge lamp as set forth in claim 1 wherein said reflective material is further effective for blocking UV radiation at wavelengths of below approximately 300 nanometers.

5. A discharge lamp as set forth in claim 4 wherein said reflective material is a titania containing an amount of antimony trioxide at a concentration of below 1 percent.

6. A discharge lamp as set forth in claim 2 wherein said calcium carbonate filled silicone resin includes an amount of silicone resin at a ratio of approximately 10 to 15 percent total weight of said adhesive material, marble flour at a ratio of approximately 50 to 80 percent of total weight, denatured alcohol at a ratio or approximately 5 to 10 percent total weight, and, triethanolamine at a ratio of less than 1 percent total weight.

7. A discharge lamp as set forth in claim 6 wherein said adhesive material further includes an amount of silica.

8. A low pressure discharge lamp comprising:
   a tubular lamp envelope having a plurality end segments associated therewith, said lamp envelope having an interior wall on which is disposed a phosphor coating and further, containing a gas fill which is energizable to a discharge state;
   a base member on which said lamp envelope is securely mounted;
   an adhesive material for securely mounting said lamp envelope to said base member; and
   a UV stabilized material added to said adhesive material so that UV radiation at a predetermined wavelength is prevented from extending beyond said plurality of end segments.

9. A discharge lamp as set forth in claim 8 wherein said adhesive material is a calcium carbonate filled silicone resin.

10. A discharge lamp as set forth in claim 9 wherein said calcium carbonate filled silicone resin includes an amount of silicone resin at a ratio of approximately 10 to 15 percent total weight of said adhesive material, marble flour at a ratio of approximately 50 to 80 percent of total weight, denatured alcohol at a ratio or approximately 5 to 10 percent total weight, and, triethanolamine at a ratio of less than 1 percent total weight.

* * * * *